Feb. 10, 1942.  H. H. STYLL  2,272,782
OPHTHALMIC MOUNTING
Filed Jan. 28, 1939
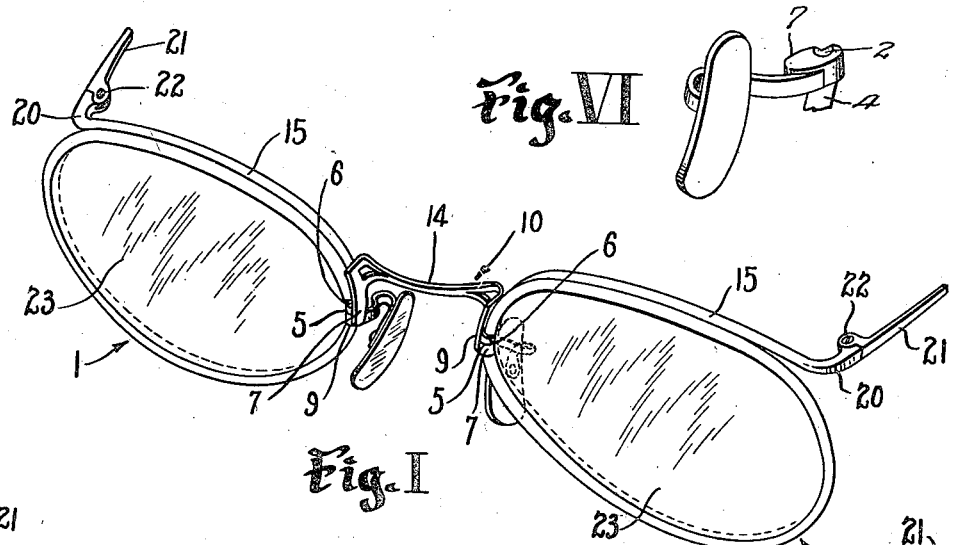
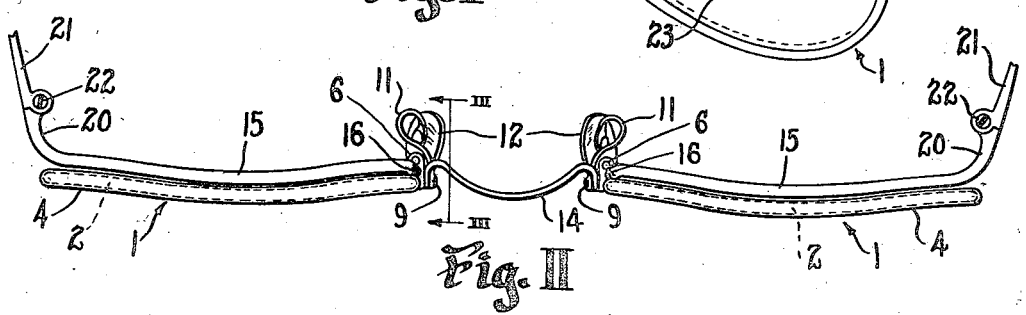
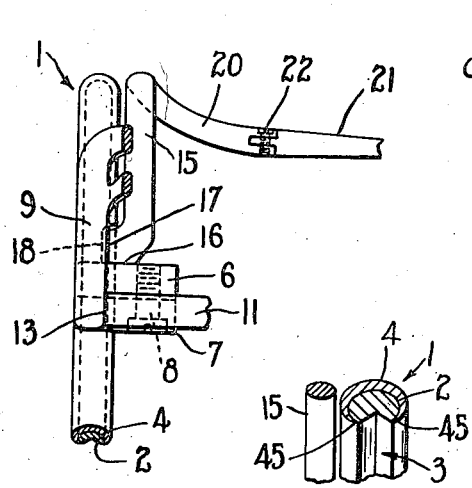
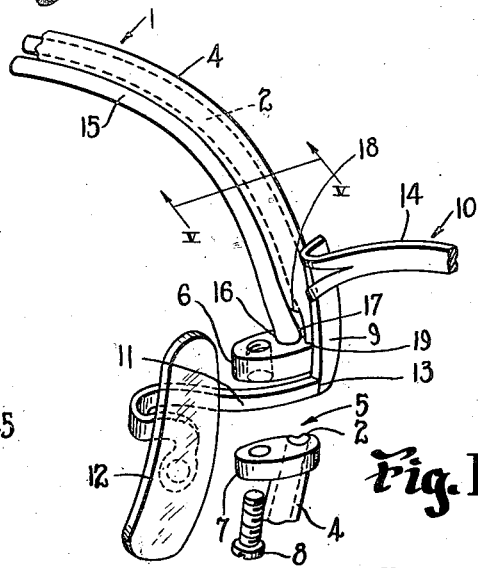
INVENTOR.
Harry H. Styll.

Patented Feb. 10, 1942

2,272,782

UNITED STATES PATENT OFFICE 2,272,782

OPHTHALMIC MOUNTING

Harry H. Styll, Southbridge, Mass., assignor to American Optical Company, Southbridge, Mass., a voluntary association of Massachusetts Application January 28, 1939, Serial No. 253,401

4 Claims. (Cl. 88—47)

This invention relates to improvements in ophthalmic mountings and has particular reference to an improved spectacle type mounting.

One of the principal objects of the invention is to provide an ophthalmic mounting, having the strength and durability of an all metal mounting, with lens supporting rims having the appearance of non-metallic material in which the adjustable parts are so formed as to provide a wide range of adjustment.

Another object of the invention is to provide an ophthalmic mounting with lens supporting rims having a non-metallic appearance yet possessing the strength and durability of metal, in combination with a supporting structure for said lens rims comprising an adjustable bridge member for joining said lens rims in desired aligned spaced relation with each other and relatively long and slender adjustable temple supports shaped generally to follow the upper contour shape of the rims and terminating in temple connections so removed from the lenses that the rims have a substantially continuous unobstructed contour with the temple supports substantially invisible when the mounting is in position of use and whereby a relatively wide range of adjustment may be made.

Another object of the invention is to provide a combination type frame comprising a metallic rim member having a non-metallic covering thereon shaped to surround the lenses and having relatively long and slender temple supporting members with a portion shaped substantially to follow the adjacent shape of the upper contour of the frame.

Another object is to provide a novel arrangement for securing a non-metallic covering to a frame type construction, such as set forth above, whereby the relatively long and slender temple supporting members will lie in the rear of said non-metallic coverings.

Another object is to provide a metal frame type structure with metallic eye wires having separated portions with connecting means adjacent the meeting ends of said portions, a supporting structure for said eye wires constituting a bridge member, nose pad supporting arms, and relatively long and slender temple supports shaped substantially to follow the upper contour shape of the eye wires and terminating in temple connections, said bridge member, nose pad supporting members and relatively long and slender temple supports all being integrally related adjacent the divided portions of the eye wires and said eye wires having a non-metallic covering thereover and shaped to fit about the connected parts of the supporting structure and eye wires to produce eye wires having the appearance of being formed only of non-metallic material.

Another object is to provide an ophthalmic mounting having metallic lens rims and a metallic supporting structure for said lens rims formed of parts which are relatively rigid, pliable or resilient or possessing one or more of said characteristics in combination with a non-metallic covering over said metallic lens rims with the said rims being divided for the insertion or removal of lenses.

Another object is to provide an improved mounting having the above characteristics whereby the said mounting will have the adjustability and strength of metal with the lens supporting rims thereof having the appearance of non-metallic material and which will be attractive in appearance and inexpensive to manufacture.

Other objects and advantages of the invention will become apparent from the following description taken is connection with the accompanying drawing and it will be apparent that many changes may be made in the details of construction and arrangement of parts shown and described without departing from the spirit of the invention as expressed in the accompanying claims. I, therefore, do not wish to be limited to the exact details of construction and arrangement of parts herein set forth as the preferred forms only have been given by way of illustration.

Fig. I is a perspective view of an ophthalmic mounting embodying the invention;

Fig. II is a top plan view of the mounting shown in Fig. I;

Fig. III is a slightly enlarged fragmentary sectional view taken as on line III—III of Fig. II and looking in the direction indicated by the arrows;

Fig. IV is a fragmentary rear perspective view of the location of assemblage of the parts of the mounting, illustrated in Fig. I, showing some of the parts separated.

Fig. V is a fragmentary slightly enlarged sectional view taken as on line V—V of Fig. IV and looking in the direction indicated by the arrows; and Fig. VI is a fragmentary perspective view of a slight modification.

In designing ophthalmic mountings it is desirable that the said mountings be so constructed as to have a wide range of adjustment so that a single mounting may be fitted to the facial characteristics of different individuals. Care also must be taken that the said mountings are desirable from the aesthetical view point. A style trend, which has received great popularity, introduced a mounting having its lens rims formed to have a non-metallic appearance and yet have metallic supporting parts which will provide the desired adjustability and sufficient rigidity to hold the parts in adjusted relation with each other. In forming such mountings it has been usual to form the lens rims of combined metal and non-metallic material with the said rims divided adjacent the temporal sides thereof and provided with means adjacent the meeting ends of said divided portions for securing the said portions together. In the past, such means for securing the meeting ends together were integrally connected with the inner metallic portion of the lens rims and protruded outwardly and rearwardly with a horn-like projection to which the temples were pivotally attached. Such combined connecting means and temple supports were limited as to adjustment and would not provide the range of adjustability desired and were also readily susceptible to becoming accidentally engaged, because of their protruding nature, with the danger of dislodging the mounting from the face and causing the lenses to become broken. It, therefore, is one of the principal objects of the invention to provide an ophthalmic mounting whereby the parts may be positively and rigidly joined with each other and so constructed as to have the adjustability, rigidity or resiliency desired with the lens rims being formed of a composite assemblage of metallic and non-metallic material, so as to have the appearance of said non-metallic material, with the supporting structure of said lens rims having an exceptionally wide range of adjustment independently of said lens rims and so arranged that the said supporting structure is substantially invisible when the mounting is viewed from the front and the usual horn-like projections from adjacent the outer side of the lens rims are removed and the said rims have a pleasing appearing, relatively continuous contour shape.

A principal feature also of the invention is to provide an improved structure whereby a single mounting may be adjusted to meet the requirements of several different individuals and yet enable the parts of the mounting to be located in desired positional relation with each other.

Referring more particularly to the drawing wherein like characters of reference designate like parts throughout the several views the device embodying the invention, shown in Figs. I to V inclusive, comprises composite lens rims 1 which, as shown in Fig. V, are composed of an inner metallic rim member having a V-shaped internal lens receiving groove 3 therein and an outer non-metallic covering held on said rim member by the clamping action of said non-metallic material. The said non-metallic material may be Celluloid, Bakelite or artificial resin having the characteristics of methyl methacrylates or the like, which may be formed to different combinations of colors. The said non-metallic materials are preferably of the type which are resistant to acids, to becoming discolored or tarnished and on which a highly polished surface may be formed.

The lens rims are divided, as illustrated at 5, and are provided adjacent the meeting ends of said divided portions with connecting lugs 6 and 7 adapted to be joined with each other to secure the meeting ends of the rims together by pins, screws or the like 8. The lugs 6 and 7 are secured to the inner metallic rims 2, as by soldering, welding or the like, and the outer non-metallic covering 4 is so shaped as to abut with said lugs 6 and 7 and yet fit about the inner metallic rims 2. The lugs 6 or 7 also provide means to which the depending portions 9 of the bridge member 10 may be attached, as by soldering or welding. In the construction, illustrated in Figs. I to V inclusive, the depending portions 9 of the bridge member are preferably secured to the sides of the lugs 6 and are provided with rearwardly extending nose pad supporting arms 11 to which nose pads 12 are pivotally attached. The said nose pad supporting arms 11 are secured, as illustrated at 13, to the depending portions 9 as by soldering, welding or the like and extend rearwardly so as to provide relatively long adjustable supports for the pads 12.

The bridge 10 is provided with a central arch portion 14 which may be formed rigid or resilient, as desired, or portions thereof may be so formed as to possess one or more of said characteristics; for example, the main central arch portion 14 may be formed relatively resilient and the depending side portions 9 relatively rigid.

The lugs 6 and 7, in addition to providing means for joining the meeting ends of the lens rims together and means to which the depending portions 9 of the bridge member are attached, also provide means, as illustrated in Figs. II, III and IV to which relatively long and slender temple supports 15 may be attached as by soldering or welding, as illustrated at 16. In this particular instance the inner end of the relatively long and slender temple support is also secured to the metallic eye wire, as illustrated at 17, in addition to being secured to the upper surface of the lug 6. The said relatively long and slender temple supports may be secured to the inner metallic eye wire 2 and lug 6 as by soldering, welding or the like. With this arrangement, the outer non-metallic covering 4 is cut away, as illustrated at 18, so as to fit about the point of connection 17 of the arm 15 with the outer non-metallic covering so fitted with the inner eye wire 2 as to engage the upper surface of the lug 6 throughout the front and side of the mounting, as illustrated at 19.

The relatively long and slender temple supports 15 are preferably formed of metal and may be formed relatively rigid, pliable or resilient, or may have portions thereof possessing one or more of said characteristics. The supports 15, in this particular instance, are shaped to follow substantially the upper contour shape of the lens rims and terminate in downwardly and rearwardly extending portions 20 to which suitable temples 21 are pivotally attached, as illustrated at 22. The said relatively long and slender temple supports 15 are preferably shaped to follow substantially the upper contour shape of the lens rims 1 in a plane in the rear of said rims, as illustrated in Figs. I to V inclusive, but it is to be understood that the said rims may be so constructed as to follow the upper contour shape of the lens rims substantially in the plane of said lens rims or in a plane in the front of said rims, as desired. In the construction, as illustrated in the drawing, the relatively long and slender temple supports are inconspicuous and substantially invisible when in position of use on the face and provide a wide range of adjustment whereby the distance between the temples may be increased or decreased by bending the portions 20 inwardly or outwardly, as desired, and the angle of the temples relative to the plane of the lenses may be altered by bending the said portions 20 upwardly or downwardly relative to the plane of said lenses, as desired. It is particularly pointed out that the lens rims 1, by reason of the fact that the portions 20 project rearwardly of said lens rims, from a plane in the rear of the plane of said lens rims, have continuous unbroken outer contour surfaces and the usual horn-like projections resulting from portions simulating the portions 20 projecting outwardly of the lens rims in the plane of said lens rims, as has been usual in the prior art, are eliminated. It is particularly pointed out that the adjustment of the temples may be formed independently of the lens rims and will in no way alter the relation of said lens rims, as regards the adjustment thereof into desired aligned spaced relation with each other to locate the centers of the lenses in proper relation with the centers of the eyes of the wearer. The adjustment of the lens rims 1 relative to each other is accomplished by bending the depending portions 9 outwardly or inwardly or by bending the central arch portion 14, as to increase or decrease the curvature thereof. The nose pads 12 may be adjusted to the requirements of the wearer by bending the arms 11 without disturbing any of the other previous adjustments.

Although the relatively long and slender temple supports are described as being attached to the upper surface of the lugs 6 and also to the adjacent portion of the inner rim or eye wire 2 it is to be understood that the said temple supports may be attached to the bridge at any point desired longitudinally of the depending portions 9 or to the rearwardly extending pad supporting arms 11, if desired. The said relatively long and slender temple supports may also be attached only to the inner metallic eye wire 2, if desired, in which instance the outer non-metallic coating would be cut away so as to surround said point of attachment.

It is also to be noted that the lenses 23, of the mounting, may be inserted or removed from the lens rims 1 by backing out the screw nut 8 an amount sufficient to allow the said lenses to be snapped in or out of said lens rims, as desired. The said lenses are provided with an outer bevelled edge shaped to fit the bevelled groove 3 internally of the metallic rims 2 and are held in the rims by clamping action introduced by drawing the lugs 6 and 7 into contact with each other by tightening the screw 8. This insertion or removal of lenses in no way alters the positional relation of the parts of the mounting and may be accomplished without disturbing any of the adjustments of said parts. It is to be understood that although applicant has described the depending portions 9 of the bridge as being secured to the lugs 6 the said depending portions may be secured to the lugs 6 or 7, as desired. The said nose pad supporting arms may also be secured to the lugs 7, as well as the depending portions 9, as desired, as illustrated in Fig. VI.

In all instances the outer non-metallic covering 4 is preferably initially formed of bar material having the outer contour shape desired of the coating 4. A groove of the shape of the inner metallic eye wire 2 is preferably milled in the bar material and, as shown in Fig. V, forms inwardly deflected continuous lip portions 45. In securing the non-metallic coating 4 to the metallic rims or eye wires 2 the lips 45 must be sprung outwardly under the inherent resilient action of the non-metallic material so as to allow the rims or eye wires to be snapped inwardly of the milled groove where upon the natural tendency of the non-metallic material to return to its initial set will cause the lips to move into binding relation with the eye wire 2 and hold the coating 4 permanently thereon.

It is to be noted that all of the integrally related metallic parts of the mounting are preferably assembled with each other prior to placing the non-metallic coating 4 on the eye wires 2.

Although the lens rims 1 are specified as being divided adjacent the nasal side thereof it is to be understood that the division may be formed at any point throughout the contour of said lens rims.

It is also to be understood that any shape of lens 23 might be used and that the lens rims 1 are shaped accordingly, in which instance, the relatively long and slender temple supports 15 will be shaped to follow substantially the upper contour shape of said lens rims.

Lenses having the prescriptive characteristics which meet the requirements of the individual for whom the mounting is being formed are placed in the lens rims 1 by opening out the connecting lugs 6 and 7, snapping the lenses in said rims and drawing the lugs together. After the lenses have been secured in proper relation with the lens rims 1 the said lens rims and lenses are adjusted to proper spaced aligned relation with each other by bending the depending portions 9 and central arch portion 14, as required to position the centers of the lenses in aligned relation with the centers of the eyes of the wearer. Care is taken that when the adjustment is completed the said lenses and lens rims will be in proper aligned relation with each other. The relatively long and slender temple supports are then adjusted so as to substantially follow the upper contour shape of the lens rims and at the same time to position the temples 21 in proper spaced relation with each other to meet the requirements of the wearer and also to properly angle the said temples relative to the plane of the lenses. During this adjusting the relatively long and slender temple supports 15 are preferably located in the rear of the plane of the lens rims and care is taken that the rearwardly extending portions 20, will be positioned in proper location relative to the line of straight ahead vision through the lenses. This location is preferably such that the temples will be above the useful field of side vision when the mounting is in position of use on the face. The said temple supports may, however, be located to extend rearwardly from a point adjacent the vertical center line of the lenses. The nose pad supporting arms 11 are then adjusted to position the pads in desired fitted relation with the nose of the wearer. After the parts have been once adjusted to the requirements of the wearer it is to be noted that the lenses 23 may be inserted or removed from the lens rims without disturbing any of said adjustments.

It is also to be noted that the rearwardly extending portions 20 are positioned in a plane in the rear of the plane of the lenses so that there are no horn-like projections extending outwardly in the plane of said lenses. The rims, therefore, have a pleasing continuous unobstructed contour when on the face.

From the foregoing description it will be seen that simple, efficient and economical means have been provided for accomplishing all of the objects and advantages of the invention, particularly that of providing an ophthalmic mounting having the strength and rigidity of an all metal type mounting and having lens supporting rims with the appearance of non-metallic material, and which will afford a wide range of adjustments.

Having described my invention, I claim:

1. An ophthalmic mounting comprising relatively slender metallic lens rims having divided portions with connecting lugs adjacent the meeting ends of said divided portions, said lugs having portions extending rearwardly of the rims and means for connecting said lugs, a bridge member having side portions secured to the lugs at a point spaced from the connection of the metallic rims to said lugs, relatively long and slender metallic temple supports each having an end secured partially to one of said lugs and to the rim adjacent said lug and shaped substantially to follow the upper contour shape of the metallic rims and terminating in temple connections and coverings of non-metallic material fitting over the metallic rims substantially continuously from adjacent one of said lugs to adjacent the other of said lugs with a portion adjacent one of the ends of said coverings cut away to fit about the connected ends of the long and slender temple supports and to permit said ends of said coverings to abut substantially with the adjacent lugs, said non-metallic coverings having such characteristics and being so fitted with the metallic rims as to be self-functioning in retaining a connected relation with said metallic rims.

2. An ophthalmic mounting comprising a pair of lenses, relatively slender metallic lens rims fitted about said lenses and having divided end portions with connecting lugs adjacent the meeting ends of said divided portions, said lugs having portions extending rearwardly of the rims and means for connecting said lugs, a bridge member having side portions secured to the lugs at a point spaced from the connection of the metallic rims to said lugs, relatively long and slender metallic temple supports each having an end secured partially to one of said lugs and to the rim adjacent said lug and shaped substantially to follow the upper contour shape of the metallic rims and terminating in temple connections and coverings of non-metallic material fitting over the metallic rims substantially continuously from adjacent one of said lugs to adjacent the other of said lugs with a portion adjacent one of the ends of said coverings cut away to fit about the connected ends of the long and slender temple supports and to permit said ends of said coverings to abut substantially with the adjacent lugs, said non-metallic coverings having such characteristics and being so fitted with the metallic rims as to be self-functioning in retaining a connected relation with said metallic rims.

3. An ophthalmic mounting comprising relatively slender metallic lens rims having divided end portions with connecting lugs adjacent the meeting ends of said divided portions, said lugs having portions extending rearwardly of the rims and means for connecting said lugs, a bridge member having side portions secured to the lugs at a point spaced from the connection of the metallic rims to said lugs, relatively long and slender metallic temple supports each having an end portion secured to one of said lugs at a location between the adjacent portion of the metallic rim and the means for connecting said lugs and shaped substantially to follow the upper contour shape of the metallic lens rims and terminating in temple connections and coverings of non-metallic material fitting over the metallic rims substantially continuously from adjacent one of said lugs to adjacent the other of said lugs with a portion adjacent one of the ends of said coverings shaped to fit between the slender metallic temple support adjacent the attached end thereof and the metallic lens rim and shaped to fit partially about said temple support adjacent said attached end so as to permit the ends of said coverings to abut substantially with the adjacent lug, said non-metallic coverings having such characteristics and being so fitted with the metallic rims as to be self-functioning in maintaining a connected relation with said metallic rims.

4. An ophthalmic mounting comprising a pair of lenses, relatively slender metallic lens rims fitted about said lenses and having divided end portions with connecting lugs adjacent the meeting ends of said divided portions, said lugs having portions extending rearwardly of the rims and means for connecting said lugs, a bridge member having side portions secured to the lugs at a point spaced from the connection of the metallic rims to said lugs, relatively long and slender metallic temple supports each having an end portion secured to one of said lugs at a location between the adjacent portion of the metallic rim and the means for connecting said lugs and shaped substantially to follow the upper contour shape of the metallic lens rims and terminating in temple connections and coverings of non-metallic material fitting over the metallic rims substantially continuously from adjacent one of said lugs to adjacent the other of said lugs with a portion adjacent one of the ends of said coverings shaped to fit between the slender metallic temple support adjacent the attached end thereof and the metallic lens rim and shaped to fit partially about said temple support adjacent said attached end so as to permit the ends of said coverings to abut substantially with the adjacent lug, said non-metallic coverings having such characteristics and being so fitted with the metallic rims as to be self-functioning in maintaining a connected relation with said metallic rims.

HARRY H. STYLL.